C. CAILLE.
HOT WATER FEED PUMP FOR LOCOMOTIVE AND OTHER BOILERS.
APPLICATION FILED OCT. 13, 1914.
1,223,667.  Patented Apr. 24, 1917.
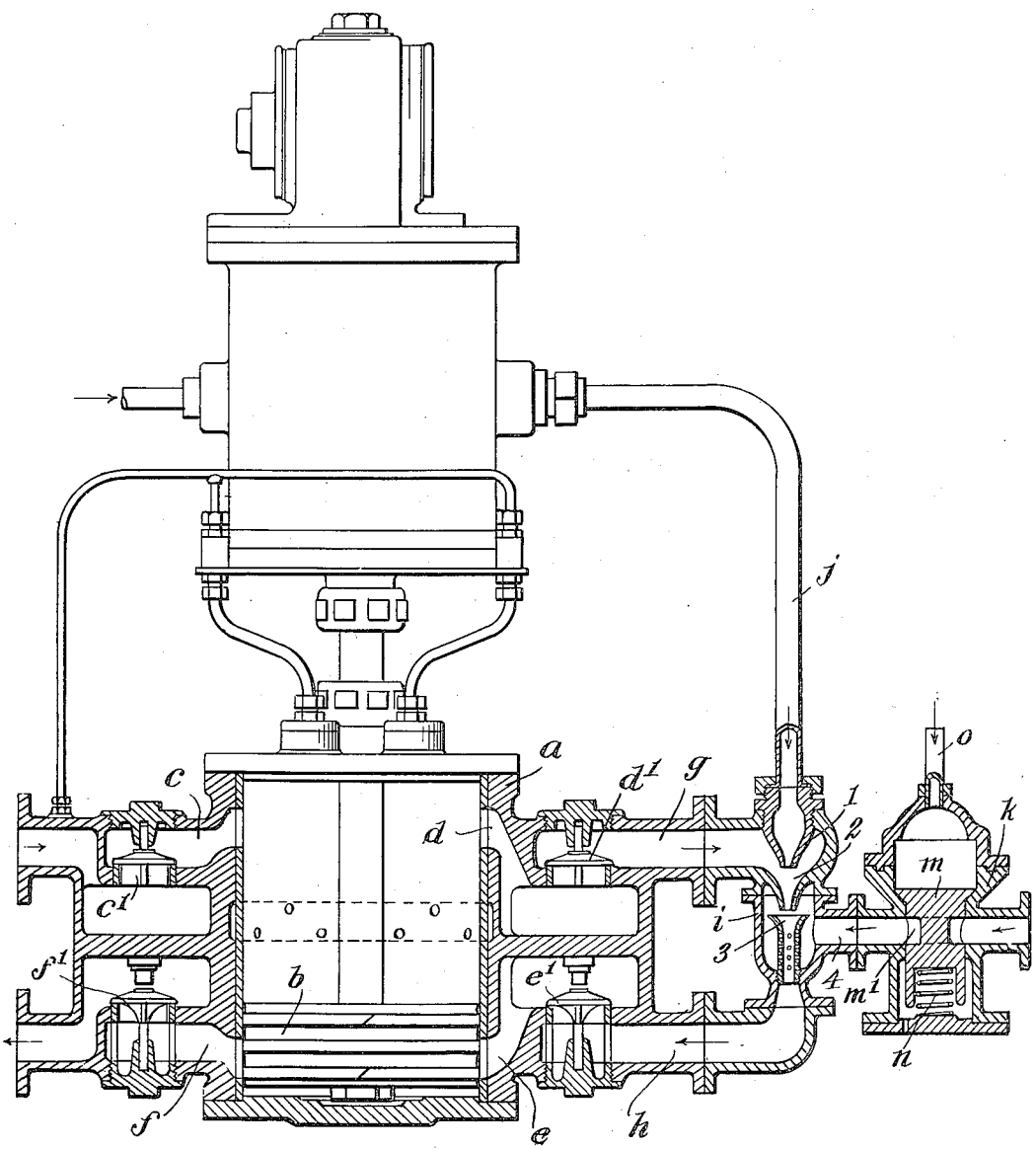
Inventor
Charles Caille
By ... Attorney.

UNITED STATES PATENT OFFICE.

CHARLES CAILLE, OF LEPERREUX, FRANCE.

HOT-WATER-FEED PUMP FOR LOCOMOTIVE AND OTHER BOILERS.

1,223,667. Specification of Letters Patent. Patented Apr. 24, 1917.

Application filed October 13, 1914. Serial No. 866,558.

*To all whom it may concern:*

Be it known that I, CHARLES CAILLE, citizen of the Republic of France, residing at No. 24 Rue de la Gaité, Leperreux, Seine, France, have invented certain new and useful Improvements in Hot-Water-Feed Pumps for Locomotive and other Boilers, of which the following is a specification.

The present invention has for its object a hot water feed pump for locomotive and other boilers.

The particular characteristic of the invention consists of the special arrangement for heating the water by the exhaust steam before its admission into the hot water pump.

A form of the invention is shown as an example in the accompanying drawing in longitudinal sectional elevation.

The example relates to a double acting feed pump sucking cold water from the tender, and forcing the water heated by the exhaust steam of the pump and of the engine.

The characteristic of this pump is that the cold water, for the purpose of being heated, is mixed with the exhaust steam of the engine in the body of a combined injector where moreover the suction of the cold water is effected by a jet fed by the exhaust steam of the pump. The cold water sucked from the tank and forced by the pump, passes by a nozzle into which projects the exhaust steam pipe of the pump and this nozzle itself projects into a mixing chamber connected by a tube to the exhaust of the engine. A mixture of water and exhaust steam thus leaves the injector by a tube connected to the suction of the hot water pump.

On the drawing, $a$ indicates the body of the pump in which is placed the piston $b$. At the upper part of the body of the pump are attached respectively the suction pipe $c$ and the outlet pipe $d$ for the cold water coming from the tank; at the lower part of the body of the pump are connected respectively the suction inlet $e$ and the forced delivery outlet $f$ for the heated water. $c^1$, $d^1$ are the suction and outlet clack valves for the cold water, $e^1$ $f^1$ being the outlet and inlet clack valves for the hot water.

On an extension $g$ $h$ arranged between the forced delivery chamber for the cold water and the suction chamber for the hot water, an injector $i$ is mounted. 1 is the nozzle of this injector connected by a pipe $j$ to the exhaust of the hot water pump. 2 is a cone in which the priming jet passing through the nozzle 1 and the cold water forced through the branch $g$ of the extension, mix. 3 is a perforated tube along the axis of which passes the jet of water leaving the nozzle 2 and through the holes in which the exhaust steam of the engine, admitted by the lateral pipe 4, mixes therewith. The injector $i$ thus forms an aspirator for the exhaust steam coming through 4 and a mixer mixing intimately the cold water forced by the pump with the steam which this water sucks. The mixture then passes through the branch $h$ of the extension to the hot water suction chamber $e$.

In conformity with the invention, the mixing aspirator arrangement is on the one hand combined with an automatic check valve placed in the admission pipe 4 for the exhaust steam of the engine. This check valve has for its object the closing of all communication between the injector and the inlet pipe for the exhaust steam, when this latter fails, that is to say when the cylinders of the engine no longer get live steam, practically this also prevents all entry of cinders or air into the pipe 4, when the driver has shut off the steam.

As shown in the drawing, the check valve consists of a chamber $k$ connected to the pipe 4 into which a stop valve $m$ can move which on one of its faces is subjected to the pressure of a spring $n$ of determined strength, while the other face by a pipe $o$ is subjected to the pressure of the live steam admitted to the cylinders of the engine.

When the live steam passes into the pipe $o$ the spring $n$ is compressed and the pipe 4 is connected to the exhaust steam of the engine. When the pressure in the pipe $o$ is suppressed or falls below a fixed value, the spring $n$ recovers its preponderance and closes the passage to the pipe 4. The valve represented by $m$ contains an annular groove $m^1$ which establishes communication with the pipe 4; when this groove is raised to the upper part of the chamber $k$ above the passage 4 the check valve is closed.

Having now described my invention, I claim:

1. Water heating means comprising a main nozzle, means of admitting water behind said nozzle, a steam priming nozzle located behind and opening into the main nozzle, and a chamber beyond said main nozzle having a steam inlet leading thereinto through which steam is induced to flow by the action of water emerging from said main nozzle.

2. Water heating means comprising a main nozzle, means of admitting water behind said nozzle, a steam priming nozzle located behind and opening into said main nozzle, a chamber beyond said main nozzle having a steam inlet, and a perforated tube at the outlet of said chamber arranged to permit of steam being induced to flow through the perforations into said tube by the stream of water flowing therein.

3. In combination with a steam pump, water heating means comprising a main nozzle, means of admitting water behind said nozzle, a steam priming nozzle supplied from the pump exhaust and located behind and opening into the main nozzle, a chamber beyond said main nozzle, and an outlet to said chamber through which steam is induced, by the action of water emerging from said main nozzle, to enter for heating the water.

4. The combination comprising a high pressure steam line, a low pressure steam line, an injector, means for supplying water to said injector, a connection between said low pressure steam line and said injector, and means for closing said connection when the pressure in said high pressure steam line is reduced.

5. The combination comprising a high pressure steam line, a low pressure steam line, an injector, means for supplying water to said injector, a connection between said low pressure steam line and said injector, a valve in said connection, and a spring arranged to close said valve, said high pressure line being in communication with said valve, whereby said valve is maintained open by the steam under pressure.

6. A feed water heating system comprising a double acting plunger pump having the suction inlet of one end in communication with the cold water supply, an injector having its water inlet in communication with the pump cold water discharge outlet, and means for admitting steam to said injector, the outlet of said injector communicating with the inlet of the other end of the pump water cylinder.

7. The combination comprising a double acting plunger pump, a high pressure steam line, a low pressure line, an injector, one end of said pump being supplied with cold water and discharging into the injector, a connection for admitting steam from said low pressure line to the injector, the water and steam condensed thereby being led to the other end of said pump and discharged therefrom, a valve in the said low pressure steam connection to the injector, and a spring to normally hold said valve closed, said valve being connected with said high pressure steam line to admit the pressure from said high pressure line to the valve, thereby maintaining the valve open when said high pressure line contains steam under pressure.

In testimony whereof I affix my signature in presence of two witnesses.

CHARLES CAILLE.

Witnesses:
 HENRI NONIN,
 H. C. HUFFER.